(12) United States Patent
Satoyama et al.

(10) Patent No.: US 11,841,779 B2
(45) Date of Patent: Dec. 12, 2023

(54) DISASTER RECOVERY SYSTEM AND DISASTER RECOVERY METHOD

(71) Applicant: Hitachi, Ltd., Tokyo (JP)

(72) Inventors: Ai Satoyama, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/939,007

(22) Filed: Sep. 7, 2022

(65) Prior Publication Data

US 2023/0176952 A1 Jun. 8, 2023

(30) Foreign Application Priority Data

Dec. 8, 2021 (JP) ................................. 2021-199067

(51) Int. Cl.
G06F 11/00 (2006.01)
G06F 11/20 (2006.01)

(52) U.S. Cl.
CPC ...... G06F 11/2023 (2013.01); *G06F 2201/85* (2013.01)

(58) Field of Classification Search
CPC ............ G06F 11/1464; G06F 11/1484; G06F 11/202–2035; G06F 11/2038; G06F 11/2048; G06F 11/2097; G06F 2201/85; G06F 2201/815
See application file for complete search history.

(56) References Cited

U.S. PATENT DOCUMENTS

| | | | |
|---|---|---|---|
| 9,477,555 B1* | 10/2016 | Hagan | G06F 11/1471 |
| 10,445,186 B1* | 10/2019 | vonThenen | G06F 11/1451 |
| 11,196,875 B2* | 12/2021 | Ishibashi | G06F 11/1438 |
| 2009/0271582 A1 | 10/2009 | Ninose | |
| 2019/0258551 A1* | 8/2019 | Cors | G06F 11/1484 |

OTHER PUBLICATIONS

Livingstone et al., "Disaster Recovery of Workloads on AWS: Recovery in the Cloud"; AWS Well-Architected Framework, 2023, Amazon Web Services, Inc. (Year: 2022).*
Bakouch, "A Disaster Recovery strategy that doesn't cost an arm and a leg", Mar. 24, 2021, https://www.linkedin.com/pulse/disaster-recovery-strategy-doesnt-cost-arm-leg-ilyas-bakouch (Year: 2021).*
Kenji Funasaki et al., "Utilization of AWS Osaka local region and Disaster Recovery attained by AWS", https://d1.awsstatic.com/webinars/jp/pdf/services/20180717_AWS-BlackBelt_OsakaLocalRegion_KIX_DR.pdf [retrieved on Sep. 28, 2021].

* cited by examiner

Primary Examiner — Michael Maskulinski
(74) Attorney, Agent, or Firm — Volpe Koenig

(57) ABSTRACT

In the disaster recovery system exemplified by the information processing system, the cloud management node manages the importance information indicating the importance placed on the performance of each application to be executed by the primary site in correspondence with the virtual computer for executing the application, determines the DR method applied to the virtual computer and the application by selection from multiple types of DR methods based on the importance information of the corresponding application for each of the virtual computers, and determines a content of a predetermined set item applied to transfer of data to be used by the virtual computer.

11 Claims, 10 Drawing Sheets

| VM (411) | APPLICATION (412) | DR METHOD (413) | TRANSFER DESTINATION (414) | COMPRESSION METHOD (415) | TRANSFER METHOD (416) | NETWORK (417) |
|---|---|---|---|---|---|---|
| 1 | 1 | PILOT LIGHT | S3 | ALGORITHM 1 | ASYNCHRONOUS COPY | LOW SPEED |
| 2 | 2 | MULTISITE | EBS | ALGORITHM 2 | SYNCHRONOUS COPY | HIGH SPEED |
| ... | ... | | | | | |

| APPLICATION (421) | IMPORTANCE (422) |
|---|---|
| 1 | LOW |
| 2 | HIGH |
| ... | ... |

| IMPORTANCE (431) | DR METHOD (432) |
|---|---|
| LOW | PILOT LIGHT |
| HIGH | MULTISITE |
| ... | ... |

| PRIMARY (441) | SECONDARY (442) |
|---|---|
| PRIMARY SITE 100 | SECONDARY SITE 200 |
| VM1 | VM1 |
| VM2 | VM2 |
| ... | ... |

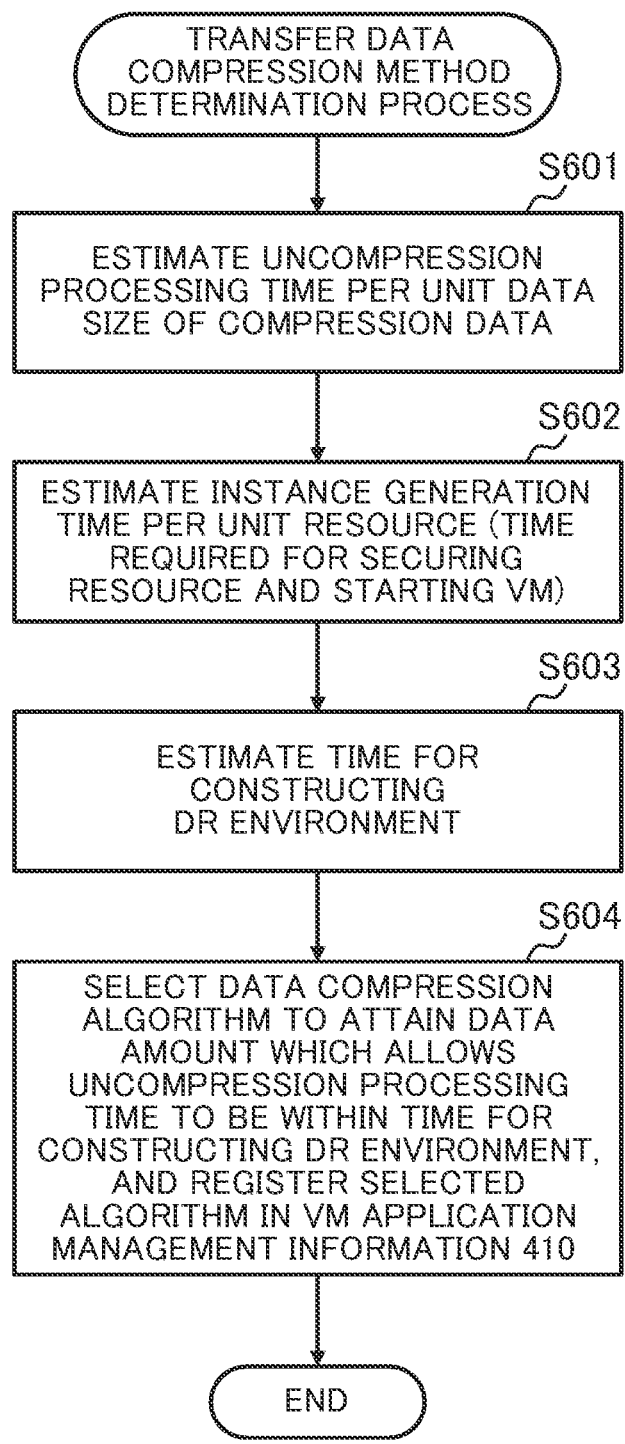

DISASTER RECOVERY SYSTEM AND DISASTER RECOVERY METHOD

BACKGROUND

The present invention relates to a disaster recovery system and a disaster recovery method, which are adapted to the disaster recovery system for providing the disaster recovery configuration, and the disaster recovery method thereof.

As disclosed in Patent Application Publication No. US2009/0271582, the disaster recovery (DR) technology has been known, which is configured to hold multiplexed data in a remote site (secondary site) in preparation for data loss in the primary site owing to a large-scale disaster such as an earthquake and a fire.

Multiple types of disaster recovery methods have been known. For example, the methods of multi-site type and pilot-light type have been introduced in the online seminar [retrieved on Sep. 28, 2021], presented by Kenji FUNA-SAKI, Yohei ICHISAKI, titled: Utilization of AWS Osaka local region and Disaster Recovery attained by AWS". URL:https://dl.awsstatic.com/webinars/jp/pdf/services/20180717_AWS-BlackBelt_OsakaLocalRegion-_KIX_DR.pdf. The method of multi-site type is implemented so that the same system as that of the primary site is constantly operated in the secondary site. Meanwhile, in the method of pilot-light type, the minimum part of the secondary site is kept in the stand-by state so that the active environment (the same environment as that of the primary site) can be immediately constructed in response to the need of recovery resulting from detection of the failure.

SUMMARY

In the case where the known disaster recovery technology is applied to the hybrid cloud environment in which the primary site is in the on-premise environment, and the secondary site is in the cloud environment, the following problem is presumed to occur. That is, provision of services to customers (users) in the primary site in the normal time increases usage of the resource at the cloud side of the secondary site, leading to increase in the resource cost at the cloud side. The service to be used by the customer is provided by the application to be executed in the primary site or the secondary site. The required performance may differ depending on the service. For example, it is not preferable to provide the low-cost service which may cause the resource cost increase.

In consideration of the foregoing viewpoints, the disaster recovery system and the disaster recovery method are proposed, which allow cost reduction in the overall disaster recovery system while providing the disaster recovery configuration adapted to the service used by the customer.

The present invention provides the disaster recovery system having a disaster recovery configuration which allows a secondary site to recover a virtual computer and an application, which have been executed in a primary site for supplying services in a normal time in response to occurrence of failure in the primary site. The system includes the primary site including a first server system for operating the virtual computer which executes the application, and a first storage system for storing data to be used by the first server system in a storage, the secondary site including a second storage system for storing backup data for backing up data used by the first server system in a cloud storage, and a second server system for recovering the virtual computer and the application in consideration of a correspondence relation in the primary site using the backup data stored in the cloud storage upon occurrence of the failure, and a cloud management node for controlling an operation to construct the disaster recovery configuration including the primary site and the secondary site, and mediating data transfer for transferring the backup data from the primary site to the secondary site. The cloud management node manages importance information indicating importance placed on a performance of each of the applications to be executed in the primary site in correspondence with the virtual computer for executing the application, determines a disaster recovery method adapted to the virtual computer and the application by selection from multiple types of the disaster recovery methods based on the importance information of the corresponding application for each of the virtual computers, and determines a content of a predetermined set item applied to the data transfer of data to be used by the virtual computer based on the importance information of the corresponding application for each of the virtual computers.

The present invention provides the disaster recovery method implemented by a disaster recovery system provided with a disaster recovery configuration which allows a secondary site to recover a virtual computer and an application, which have been executed in a primary site for supplying services in a normal time in response to occurrence of failure in the primary site. The disaster recovery system includes the primary site having a first server system for operating the virtual computer which executes the application, and a first storage system for storing data to be used by the first server system in a storage, the secondary site having a second storage system for storing backup data for backing up data used by the first server system in a cloud storage, and a second server system for recovering the virtual computer and the application in consideration of a correspondence relation in the primary site using the backup data stored in the cloud storage upon occurrence of the failure, and a cloud management node for controlling an operation to construct the disaster recovery configuration including the primary site and the secondary site, and mediating data transfer for transferring the backup data from the primary site to the secondary site. The cloud management node manages importance information indicating importance placed on a performance of each of the applications to be executed in the primary site in correspondence with the virtual computer for executing the application, determines a disaster recovery method adapted to the virtual computer and the application by selection from multiple types of the disaster recovery methods based on the importance information of the corresponding application for each of the virtual computers, and determines a content of a predetermined set item applied to the data transfer of data to be used by the virtual computer based on the importance information of the corresponding application for each of the virtual computers.

The present invention allows cost reduction in the overall disaster recovery system while providing the disaster recovery configuration adapted to the service used by the customer.

BRIEF DESCRIPTION OF THE DRAWINGS

FIG. 4 is a view of an example of VM application management information 410;

FIG. 5 is a view of an example of application importance management information 420;

FIG. 6 is a view of an example of importance DR management information 430;

FIG. 7 is a view of an example of DR management information 440;

FIG. 13 is a flowchart representing another processing procedure example of transfer data compression method determination processing.

DETAILED DESCRIPTION

Figure 1:
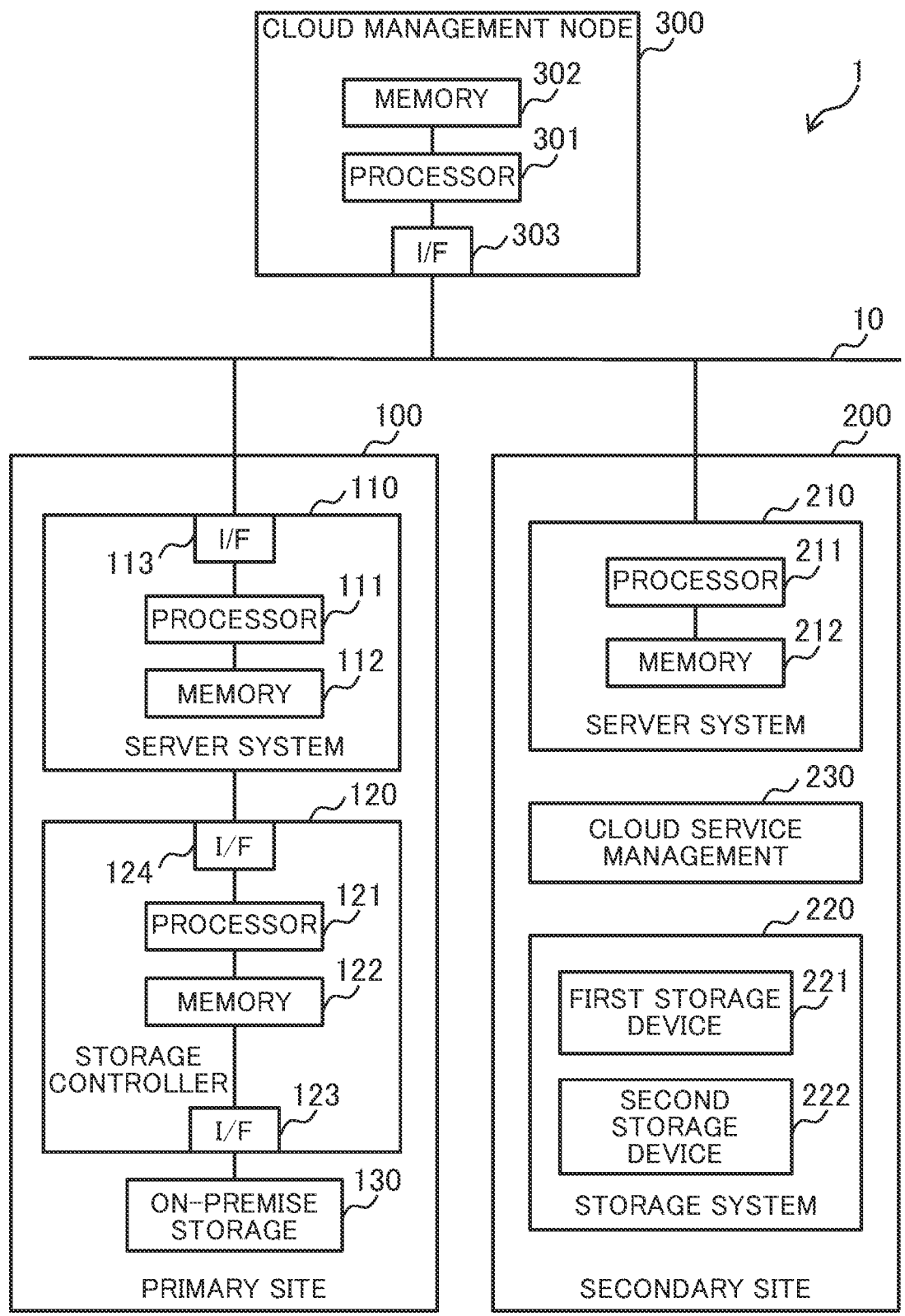
FIG. 1 is a block diagram illustrating a hardware configuration example of an information processing system 1 according to an embodiment of the present invention.

An embodiment of the present invention will be described referring to the drawings.

The following embodiment will be described for illustrative purposes by omitting and simplifying the explanation to clarify the description. All combinations of characteristics described in the embodiment are not necessarily essential for the solution provided by the invention. The present invention is not limited to the embodiment. All applications conforming to the idea of the present invention may be contained in the technical scope of the present invention. A person skilled in the art is capable of implementing the present invention through various additions and modifications within a scope of the invention. The present invention may be implemented in various forms, and provided with either single component or multiple components unless otherwise restricted.

In the following description, the term "table" is used for explaining the information of the present invention. However, the information does not have to be expressed by the data structure using the table. It may be expressed as the data structure such as "list" and "DB (database)", or other terms. In order to represent independence from the data structure, such term as "table", "list", and "DB" may be simply referred to as "information". Upon description of each content of the information, it is possible to use such term as "identification information", "identifier", "title", "name", and "ID", which can be mutually replaced.

In the following description, the program is executed for conducting processing. The program is executed by at least one unit of processor or more (for example, CPU) so that the specified processing is conducted using storage resource (for example, memory) and/or interface device (for example, communication port) appropriately. Accordingly, the description may be made based on the interpretation that the processing is conducted by the processor as the processing entity. Similarly, the program is executed by the processing entity which may be a controller, a device, a system, a computer, a node, a storage system, a storage device, a server, a management computer, a client, and a host, which-ever the processing entity having the processor. The processing entity (for example, processor) for executing the program may be provided with a hardware circuit which partially or fully conducts the processing, or may be modulized. For example, the processing entity for executing the program may be provided with the hardware circuit which executes encryption/decryption, or compression/decompression. Various types of programs may be installed in the respective computers via program distribution servers and storage media. The processor is operated in accordance with the program to serve as a function unit for implementing a predetermined function. The device and the system having the processor include those function units. The "read/write processing" may be referred to as "updating processing".

In each drawing, the common structure is designated with the same reference number. Referring to the drawings, if the explanation will be made with respect to the similar elements without discrimination thereamong, the reference code or the common number corresponding to the reference code will be used. If the explanation will be made by discrimination among the similar elements, the reference code designated to the element, or the ID allocated to the element may be used in place of the reference code.

(1) Configuration

FIG. 1 is a block diagram illustrating a hardware configuration example of an information processing system 1 according to an embodiment of the present invention.

Referring to FIG. 1, the information processing system 1 as a disaster recovery system which provides the disaster recovery configuration includes a primary site 100, a secondary site 200, and a cloud management node 300, which are mutually connected via a network 10 (typically, IP (Internet Protocol) network). The embodiment will be described with respect to the disaster recovery configuration using an on-premise-based storage system (on-premise storage) for the primary site 100, and a cloud-based storage system (cloud storage) for the secondary site 200. The configuration may be arbitrarily made so long as at least the cloud storage is used for the secondary site. The use of the cloud storage for the primary site 100 will keep essential features of the present invention unchanged. In the description, the "disaster recovery" may be abbreviated to DR (Disaster Recovery) for simplifying the description.

The primary site 100 is a storage system for providing the user (customer) with services by application in a normal condition, and constituted of an on-premise storage system. Specifically, the primary site includes a server system 110, a storage controller 120, and an on-premise storage 130.

The server system 110 includes a processor 111, a memory 112, and a network interface (I/F) 113, and is connected to the network 10 via the I/F 113. The storage controller 120 includes a memory 122, a front-end network interface (I/F) 124, a back-end storage interface (I/F) 123, and a processor 121 which is connected to the memory and the interfaces. The storage controller 120 is connected to the server system 110 via the I/F 124, and to the on-premise storage 130 via the I/F 123. The on-premise storage 130 is a storage device for physically storing data. The memories and processors of the server system 110 and the storage controller 120 are made redundant, respectively.

The memory 122 stores information, and one or more programs. The processor 121 executes the one or more programs to process an I/O (Input/Output) request such as provision of a storage region (described as the logical volume) to the server system 110, the write request and the read request from the server system 110. For example, the server system 110 receives the write or read request designating the volume from the upper device (host) operated by the user (customer), and such request is transmitted to the storage controller 120. In response to the wright or read request, the storage controller 120 reads/writes data corresponding to the volume in the on-premise storage 130.

The storage controller 120 and the on-premise storage 130 may be integrated into a single storage system, for example, the high-end storage system and the storage system using flash memory by RAID (Redundant Array of Independent (or Inexpensive) Disks) technology.

The on-premise storage 130 may be configured as a node group (for example, distribution system) with multi-node structure which includes multiple storage nodes each having a storage device. Each of the storage nodes may be a general-purpose physical computer. Each of the physical computers executes the predetermined software to allow construction of SDx (Software-Defined anything). For example, SDS (Software-Defined Storage) or SDDC (Software-Defined Datacenter) may be employed for the SDx. The on-premise storage 130 may be configured as the system which implements the function serving as a hyper converged infrastructure-based storage system, for example, the host system for issuing the I/O request (an execution body (for example, virtual machine and container) of the application for issuing the I/O request), and the function serving as the storage system for processing the I/O request (for example, execution body of the storage software (virtual machine and container)). The foregoing configuration of the on-premise storage 130 is an exemplified case, which is not limited to the one as described above.

The secondary site 200 serves as a disaster recovery site (DR site) for holding data stored in the primary site 100 in case of data loss which occurs therein owing to a large-scale disaster such as an earthquake and a fire. Upon failure in the primary site 100, the data held in the secondary site are used for recovering those data and services of the primary site 100. The secondary site 200 of the information processing system 1 according to the embodiment typically belongs to the public cloud, which serves as the cloud storage system functioning as a base of the cloud storage service provided by the cloud vendor. For example, AWS® (Amazon Web Services), Azure®, Google Cloud Platform®, and the like may be employed for the cloud storage service. As for the cloud storage system for the secondary site 200, the storage system belonging to the cloud of other type (for example, private cloud) may be employed in place of the public cloud. A configuration of the public cloud will be described as an exemplified case.

The secondary site 200 includes a server system 210 and a storage system 220, and is connected to the network 10.

The server system 210 includes a processor 211 and a memory 212 (a storage may further be included), and a network interface (not shown), and is connected to the network 10 via the network interface. A storage system 220 includes storages with different performances and capacity costs, for example, a high-cost first storage device 221 for high-end, and a low-cost second storage device 222 with large capacity. Each of the first storage device 221 and the second storage device 222 includes a part which is the same as that of the storage controller 120, and a physical data storage part. As a specific example of the storage system 220, the first storage device 221 corresponds to the block storage provided by the storage service so called "EBS" in the AWS®, and the second storage device 222 corresponds to the object storage provided by the storage service so called "S3" in the AWS®. The object storage has a feature of being incapable of performing data synchronization.

A cloud service management 230 is a component which implements the function of managing overall cloud services. Normally, the cloud is used to construct the environment required by the user through the process in which the cloud service management 230 in the cloud service receives the user's request, and the resource adapted to the user's request is selected from those with multiple different specifications in the cloud. This applies to the secondary site 200 according to the embodiment. The server system (that is, the server system 210) and the storage system (storage system 220) may be the main resource in the cloud service. The cloud service management 230 may be an appliance (dedicated device) or a physical computer. The cloud service management 230 may be formed as a part of the server system 210, or provided in the cloud management node 300. An explanation will be made with respect to the cloud service management as the program stored in a single unit of the memory 212 of the server system 210 in the cloud service (referring to FIG. 1, it is illustrated as the structure separated from the memory 212 of the server system 210 in the secondary site 200 for easy understanding).

The cloud management node 300 is an appliance for executing control of constructing the DR configuration constituted by the primary site 100 and the secondary site 200, and mediating the data transfer between the primary site 100 and the secondary site 200. For example, the cloud management node 300 may be in the cloud service or in the cloud service management 230 in the secondary site 200. An explanation will be made with respect to the cloud management node 300 exemplified by a physical computer including a memory 302 and an I/F 303, and the processor 301 connected to those components.

The information processing system 1 as illustrated in FIG. 1 is configured to directly transfer data between the on-premise storage 130 in the primary site 100 and the cloud storage in the secondary site 200 (first storage device 221, the second storage device 222) via the network 10. However, the data transfer method is not limited to the one as described above. Data may be transferred using another network path or line for data transfer. The essence of the present invention does not lie in specific types of various networks and lines.

The network 10 may be connected to the storage management system. For example, the storage management system is a computing system (one or more computers) for managing a storage area configuration of the on-premise storage 130, and allows the user to give an instruction with respect to a setting related to the on-premise storage 130.

Figure 2:
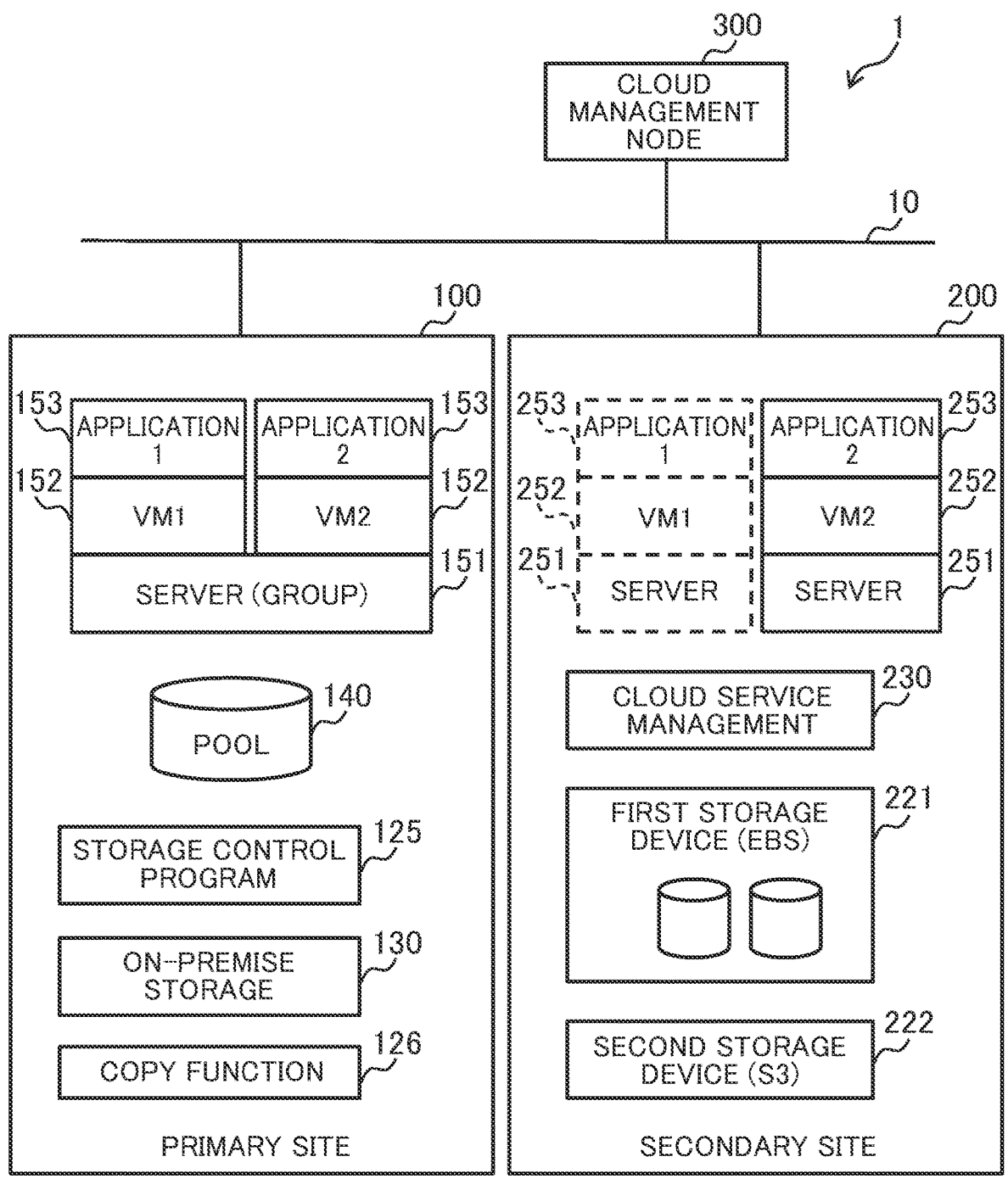
FIG. 2 illustrates how the information processing system 1 is operated.

FIG. 2 illustrates how the information processing system 1 is operated.

As FIG. 2 illustrates, in the primary site 100, one or more VMs 152 are generated on a server (server group) 151 constituted by one or more server systems 110. The VM 152 is a virtual machine on which the application 153 designated by the user is executed. The application 153 designated by the user serves to supply services to the user. Specification of the service to be used by the user allows designation of the application 153 corresponding to the service.

In the primary site 100, capacity virtualization technology allows storage of data in the storage region within the on-premise storage 130 via a pool 140. A storage control program 125 is stored in the memory 122 of the storage controller 120 for controlling the on-premise storage 130. A copy function 126 is a function (or program for the function) implemented by the program stored in the memory 122 of the storage controller 120. The function serves to copy data stored in the on-premise storage 130 in the primary site 100 to transfer such data to the secondary site 200.

The memory 112 of the server system 110 stores VM control information (not shown). The VM control information may be stored in the on-premise storage 130. The VM control information includes the information for controlling the VM 152, for example, the information indicating an amount of resource (for example, volume) to be allocated to each of the VMs 152.

As described above, the application 153 executed on the VM 152 is instructed by the user. The memory of the server 151 (that is, the memory 112 of the server system 110) stores the information of correspondence between identifiers of the VM and the application 153 to be executed thereon. Alternatively, the identifier correspondence information may be stored in a not shown storage management system (computing system for managing the storage region configuration of the on-premise storage 130) to be connected via the network 10.

In the information processing system 1, the cloud management node 300 acquires the resource configuration information and the application information of the primary site 100 for issuing an instruction to the cloud service side to construct the DR environment where the secondary site 200 executes the application (application 253) on the VM (VM 252), which is the same as that of the primary site 100. The resource configuration information and the application information of the primary site 100 will be stored in the memory 112 of the server system 110 or the on-premise storage 130. However, the information data may be stored in the not shown storage management system to be connected via the network 10.

As described above, methods at different levels are used for implementing the disaster recovery (DR). The DR methods at different levels may be used by the information processing system 1 according to the embodiment. The user is allowed to give an instruction to use the selected DR method, or the system side may be configured to automatically select the DR method. The DR method may be designated in a unit of VM or volume. An explanation will be made herein with respect to the DR method to be designated for each VM as an exemplified case.

Importance placed on the performance of the application executed on the virtual machine (VM) for providing services is variable depending on the application. For example, some application may have the performance placed with the highest importance, and some application may be considered as being allowable even if RTO (Recovery Time Objective) is lowered to a slight degree. The information processing system 1 according to the embodiment is configured to manage "importance" information indicating the importance placed on each performance of the applications 153 to be executed on the VM 152. Based on the importance information, the disaster recovery level adapted to each of the VMs (DR method) is selected to construct the cloud DR configuration.

Specifically, referring to FIG. 2, if higher importance is placed on the performance of the "application 2" to be executed on the "VM2" in the primary site 100, the method of multi-site type is selected for the "VM2" in the cloud of the secondary site 200 so that the server resource for the "application 2" with higher importance is secured immediately after starting construction of the DR configuration. Meanwhile, if lower importance is placed on the performance of the "application 1" to be executed on the "VM1" in the primary site 100, the method of pilot-light type is selected for the "VM1" in the cloud of the secondary site 200 so as not to secure the server resource for the "application 1" with lower importance when starting construction of the DR configuration. If the method of pilot-light type is selected for the "VM1", the server resource for the "application 1" is secured upon switching of the site to be operated from the primary site 100 to the secondary site 200.

Utilizing the application importance information to be referred upon selection of the DR method, the information processing system 1 according to the embodiment implements the data transfer method and data transfer destination storage device selection method in accordance with the importance, or the method derived from combining those methods for data transfer between the primary site 100 and the secondary site 200. This makes it possible to attain cost reduction of the cloud DR.

An explanation will be briefly made with respect to the DR environment construction procedure conducted by the information processing system 1 according to the embodiment.

The "importance" information of the application 153 in the primary site 100 is processed on the assumption to be described blow. For example, the cloud management node 300 (processor 301) determines the application "importance" information from the result derived from the command or the user's instruction through an input operation from the GUI (Graphical User Interface) for user's input, the result derived from collection/analysis of the information by the cloud management node 300, or the like. Such "importance" information is preliminarily registered in application importance management information 420 in the memory 302 of the cloud management node 300 (detailed explanation will be made later referring to FIG. 5). In the example to be described in the embodiment, the application 153 as the "application 1" to be executed on the VM 152 as the "VM1" has the lower importance, and the application 153 as the "application 2" to be executed on the VM 152 as the "VM2" has the higher importance.

The cloud management node 300 (processor 301) refers to the importance information registered in the application importance management information 420 to determine the DR method in accordance with the importance, and registers the DR method in importance DR management information 430 (detailed explanation will be made referring to FIG. 6). As described above, the application to be executed on the VM may be the one having its performance placed with higher importance, or the one regarded as being allowable even if the RTO is lowered to a slight degree (the performance is placed with low importance). Accordingly, the VM for executing the application having its RTO placed with higher importance (that is, application with high importance) is used for constructing the DR environment by the method of multi-site type. The VM for executing the application having deterioration in the RTO regarded as allowable (that is, application with low importance) is used for constructing the DR environment by the method of pilot-light type.

Specifically, the cloud management node 300 receives the VM control information of the primary site 100 and the information of the application 153 to be executed on the VM 152 from the primary site 100, and manages the information data in the VM application management information 410. The cloud management node 300 then selects the DR method corresponding to the VM 152 (VM 252) with reference to the importance information, and gives an instruction on DR environment construction request to the secondary site 200.

The cloud service management 230 in the secondary site 200 selects the resource in the cloud in accordance with the request for the DR environment construction, and executes allocation of the resource.

In the case of the DR configuration corresponding to the application 1 with low importance, the resource such as the server system is not secured in the DR destination (secondary site 200) in the normal state, and the resource is secured upon start of the fail-over in response to occurrence of failure. Referring to the secondary site 200 in FIG. 2, the "application 1" with low importance (application 253), the "VM1" for executing the application (VM 252), and the server 251 for generating the VM are shown by broken lines. In the method of pilot-light type, data in the primary site 100 are constantly transferred to the DR destination despite the DR configuration as described above.

In the DR configuration corresponding to the application 2 with high importance, normally, the same server environment as that in the primary site 100 is constructed in the DR destination (secondary site 200). The data in the primary site 100 are constantly transferred to the DR destination. The method of multi-site type is implemented to execute the foregoing processing.

In the cloud, the resource usage charge is generated upon allocation of the resource. Accordingly, the use of the resource is minimized until the need of allocating resource to the application with low importance as described above so that the DR cost can be reduced.

A DR management program 460 (see FIG. 3) of the cloud management node 300 transfers data in the primary site 100 into the secondary site 200 via the cloud management node 300. Data are transferred between the primary site 100 and the secondary site 200 by implementing the method selected from various data transfer methods of multiple types. The process of determining the method will be described referring to FIG. 8.

Figure 3:
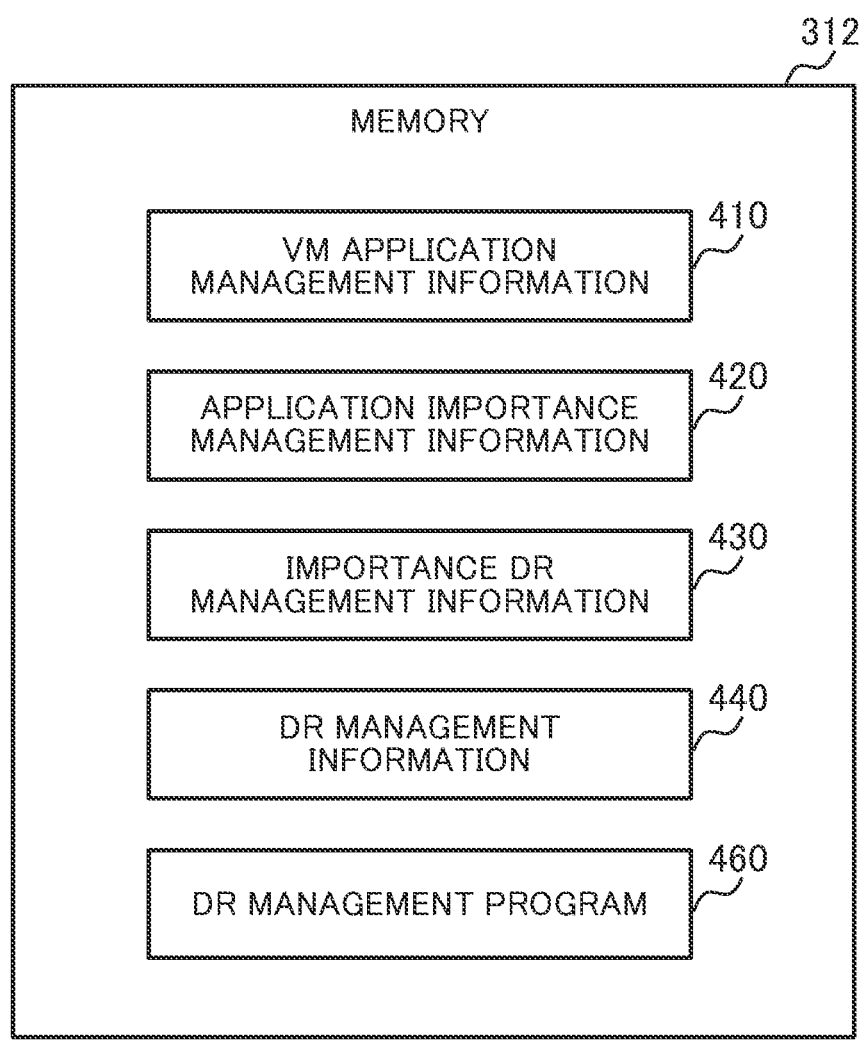
FIG. 3 illustrates control information and a control program, which are stored in a memory 302.

FIG. 3 illustrates control information and a control program, which are stored in the memory 302. As illustrated in FIG. 3, the memory 302 of the cloud management node 300 stores such control information as the VM application management information 410, the application importance management information 420, the importance DR management information 430, and the DR management information 440. Specific examples of the control information data will be illustrated in FIGS. 4 to 7. The memory 302 stores a not shown program.

The DR management program 460 issues an instruction to construct the DR environment between the primary site 100 and the secondary site 200, forms a pair of the VM and the application corresponding to the DR environment, and controls data transfer from the primary site 100 to the secondary site 200.

FIG. 4 is a view of an example of the VM application management information 410. The VM application management information 410 includes management information relating to the VM 152 generated on the server 151 in the primary site 100. The VM application management information 410 as an example illustrated in FIG. 4 is constituted by fields including a VM 411, an application 412, a DR method 413, a transfer destination 414, a compression method 415, a transfer method 416, and a network 417.

The VM 411 stores an identifier which identifies the VM 152. The application 412 stores an identifier of the application 153 to be executed on the VM. For example, FIG. 4 represents that the "VM1" executes the "application 1", and the "VM2" executes the "application 2". The DR management program 460 acquires corresponding information of the VM 411 and the application 412 from the primary site 100 so that such information is preliminarily registered in the VM application management information 410.

The DR method 413 stores the type of DR method for executing DR of the VM 152. Information of the DR method 413 is processed as described below. The cloud management node 300 (DR management program 460) refers to the application importance management information 420 and the importance DR management information 430 to determine the DR method in accordance with the importance of the application 153, and registers the determination result. Specifically, in the embodiment, the DR management program 460 determines to select the method of multi-site type which allows construction of DR environment of the VM 152 for executing the application 153 with "high" importance, and to select the method of pilot-light type which allows construction of DR environment of the VM 152 for executing the application 153 with "low" importance. That is, the "multi-site" type is registered as the DR method 413 for the "VM2" which executes the "application 2". The "pilot-light" type is registered in the DR method 413 for the "VM1" which executes the "application 1". Determination of the DR method is adaptable to the service desired by the customer.

The transfer destination 414 stores storage model information of the DR destination (strictly, the transfer data storage destination). Specifically, as the "VM1" executes the "application 1" with low importance, the performance of the storage model of the transfer destination of the DR is not placed with high importance. In the case as illustrated in FIG. 4, "S3" is registered as the storage service which exhibits excellent cost performance, and has capacity with no upper limit in the transfer destination 414 corresponding to the "VM1". Meanwhile, as the "VM2" executes the "application 2" with high importance, the "EBS" is registered as the high-performance storage service in the transfer destination 414 corresponding to the "VM2". The storage model information to be stored in the transfer destination 414 is not limited to the name of the device. Such information may be the identifier indicating the storage class, for example, high-end, midrange, or the like. The information in the transfer destination 414 is determined and registered through execution of the data transfer destination determination processing (see FIG. 8) by the DR management program 460 to be described later.

The compression method 415 stores information of a compression algorithm type for storing data to be used by the VM 152 in the storage device. The information processing system 1 provides multiple types of compression algorithms (compression methods) each having different feature relating to the data compression/decompression. It is assumed that among those algorithms, the "algorithm 1" as shown in FIG. 4 is the compression algorithm with high data compression ratio, and the "algorithm 2" is the compression algorithm for decompressing the compressed data at high speeds (in other words, short decompression time). The DR management program 460 acquires the corresponding information from the primary site 100, and executes the transfer data compression method determination processing (see FIG. 9) to be described later so that the information of the compression method 415 is determined and registered. Specifically, the case in FIG. 4 shows that the "algorithm 1" is registered in the compression method 415 corresponding to the "VM1", and the "algorithm 2" is registered in the compression method 415 corresponding to the "VM2". As this case represents, the data used for the "VM1" are stored in the on-premise storage 130 while having data compressed using the "algorithm 1", and the data used for the "VM2" are stored in the on-premise storage 130 while having data compressed using the "algorithm 2".

The transfer method 416 stores the data transfer method to be implemented for data transfer from the primary site 100 to the secondary site 200. The data transfer method to be stored in the transfer method 416 may be "synchronous copy" for copying data synchronously, and "asynchronous copy" for copying data asynchronously. However, other data transfer method may be selected. The information of the transfer method 416 is determined and registered through execution of the data transfer destination determination process (see FIG. 8) to be described later by the DR management program 460.

The network 417 stores the information indicating the network type defined by the line type to be used, the band or the like with respect to the data transfer path (network) from the primary site 100 to the secondary site 200. Referring to FIG. 4, the "low speed" denotes the use of the low-cost network band at low communication speed, and the "high speed" denotes the use of the high-cost network band at high communication speed. The information of the network 417 is determined and registered through execution of the data transfer network determination process (see FIG. 10) to be described later by the DR management program 460.

FIG. 5 is a view of an example of the application importance management information 420. The application importance management information 420 includes information indicating the importance placed on the application 153 to be executed on the VM 152. The application importance management information 420 in FIG. 5 includes fields of an application 421 and an importance 422.

The application 421 stores an identifier for identifying the application 153 to be executed on the VM 152. The importance 422 stores the "importance" preliminarily placed on the performance of the application. The "importance" of the application may be designated and registered by the user, or automatically set by the computer side through analysis of the past information. Referring to the case as illustrated in FIG. 5, the "application 1" is registered as the application with "low" importance, and the "application 2" is registered as the application with "high" importance. The value stored in the importance 422 may be an identifier, a numerical value, or the like, which allows identification of the "importance". An arbitrary number of stages of the importance may be set so long as it is set to the value equal to or more than 2. The "importance" of the application is preliminarily set. However, it is possible to change the "importance" in the middle of operating the system in response to designation or analysis of the program by the user.

FIG. 6 is a view of an example of the importance DR management information 430. The importance DR management information 430 includes DR method information corresponding to the importance of the application registered in the importance 422 of the application importance management information 420. The importance DR management information 430 represented in FIG. 6 as an example includes fields of an importance 431 and a DR method 432.

The importance 431 stores the importance of the application preliminarily set in accordance with the importance placed on the application performance. The importance corresponds to the importance 422 registered in the application importance management information 420. The DR method 432 stores the DR method corresponding to the importance of the application. Each of the importance DR management information 430 is preliminarily registered by the user. Referring to the importance DR management information 430 in FIG. 6, in the case of DR of the application with low importance, the DR environment is constructed by the method of pilot-light type. In the case of DR of the application with high importance, the DR environment is constructed by the method of multi-site type.

FIG. 7 is a view of an example of the DR management information 440. The DR management information 440 includes information indicating a relationship (related to DR) of the corresponding pair in the DR environment. The DR management information 440 as an exemplary case in FIG. 7 includes fields of a primary 441 and a secondary 442, respectively.

The primary 441 stores identifiers indicating the respective configurations (primary site 100, VM 152, and the like) at the primary side of the DR. The secondary 442 stores identifiers indicating the respective configurations (secondary site 200, VM 252, and the like) at the secondary side of the DR.

(2) Processing

A detailed explanation will be made with respect to processing to be executed by the information processing system 1 for constructing the DR environment using the above-described configuration.

(2-1) Data Transfer Destination Determination Processing

Figure 8:
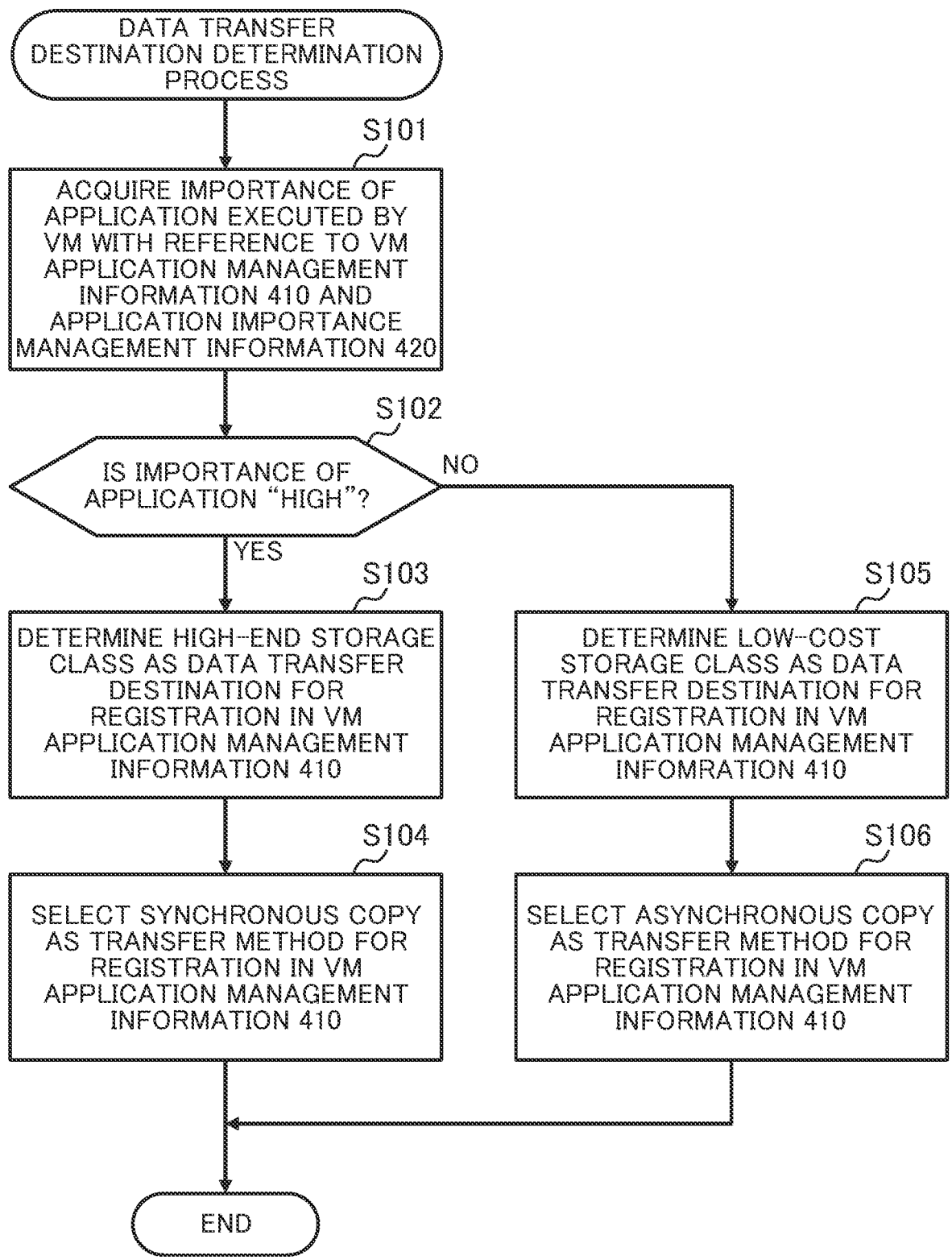
FIG. 8 is a flowchart representing a processing procedure example of data transfer destination determination processing.

FIG. 8 is a flowchart representing a processing procedure example of the data transfer destination determination processing. The data transfer destination determination processing is executed for determining the data transfer destination storage and the data transfer method for data transfer from the primary site 100 to the secondary site 200. The processing for each of the VMs 152 is executed by the DR management program 460 of the cloud management node 300 for each of the VMs 152.

As FIG. 8 represents, with reference to the VM application management information 410 and the application importance management information 420, the DR management program 460 acquires importance of the application 153 to be executed by the VM 152 as a processing object (step S101).

The DR management program 460 confirms whether the importance of the application, which has been acquired in step S101 satisfies a predetermined determination criterion of the importance (step S102). In accordance with the determination result, the storage resource class of the data transfer destination (or the storage model which can be designated as the cloud service) is determined from the storage resources in the cloud service (secondary site 200) as the DR destination. Referring to the processing example in FIG. 8, if the importance of the application, which has been acquired in step S101 is "high" (YES in step S102), the process proceeds to step S103. If the importance of the application, which has been acquired in step S101 is "low" (NO in step S102), the process proceeds to step S105.

When the process proceeds from step S102 to step S103, the DR management program 460 determines the high-end storage device in the cloud as the data transfer destination to which data used by the VM 152 as the processing object are transferred. The determined content is then registered in the transfer destination 414 of the VM application management information 410. Specifically, the first storage device 221 is determined as the data transfer destination to which data used by the VM2 for executing the application 2 with high importance are transferred. Then the "EBS" as the model information of the first storage device 221 is registered in the transfer destination 414 corresponding to the VM2 (application 2).

In the subsequent step S104, the DR management program 460 determines the data transfer method, and the determined content is registered in the transfer method 416 of the VM application management information 410. Determination of the high-end storage device (first storage device 221) as the data transfer destination in step S103 indicates that the data of the application 2 with high importance are important while having the RPO (Recovery Point Objective) placed with high importance as well. Accordingly, in step S104, the DR management program 460 selects the data transfer method utilizing synchronous copy as the transfer method of the data used by the VM2 from the primary site 100 to the secondary site 200. The "synchronous copy" is then registered in the transfer method 416 corresponding to the VM2 (application 2).

Meanwhile, when the process proceeds from step S102 to S105, the DR management program 460 determines the low-cost storage device in the cloud as the transfer destination of data to be used by the VM 152 as the processing object, and registers the determined content in the transfer destination 414 of the VM application management information 410. Specifically, the second storage device 222 is determined as the data transfer destination to which the data used by the VM1 for executing the application 1 with low importance are transferred. The "S3" as the model information of the second storage device 222 is registered in the transfer destination 414 corresponding to the VM1 (application 1).

Next, in step S106, the DR management program 460 determines the data transfer method, and registers the determined content in the transfer method 416 of the VM application management information 410. Determination of the low-cost storage device (second storage device 222) as the data transfer destination in step S105 indicates that the data of the application 1 with low importance are regarded as being allowable despite deterioration in the RTO to a slight degree. In step S106, the DR management program 460 selects the data transfer method utilizing asynchronous copy as the method for transferring data to be used by the VM 1 from the primary site 100 to the secondary site 200, and registers the "asynchronous copy" in the transfer method 416 corresponding to the VM1 (application 1).

At the end of processing in step S104 or S106, the DR management program 460 finishes execution of the data transfer destination determination processing.

The data transfer destination determination processing may be modified as described below. For example, in the case of the application with high importance, the DR management program 460 may be configured to select asynchronous copy to be utilized for the data transfer method in step S104. If the storage device as the determined data transfer destination is the object storage, the DR management program 460 selects the asynchronous copy to be utilized for the data transfer method as the object storage has a feature of being incapability of overwriting data. In the case of the asynchronous copy selected to be utilized for the data transfer method, the DR management program 460 may be configured to select any one of multiple data transfer methods corresponding to the asynchronous copy. For example, besides the method utilizing asynchronous copy which never attains synchronization, a so-called differential copy may be selected for periodically transferring the difference in the snap shot.

As described above, the DR management program 460 executes the data transfer destination determination processing based on the importance of the application 153 to be executed on the VM 152. This makes it possible to appropriately determine the data transfer destination storage and the data transfer method upon data transfer from the primary site 100 to the secondary site 200 in accordance with the service used by the customer.

(2-2) Transfer Data Compression Method Determination Processing

Figure 9:
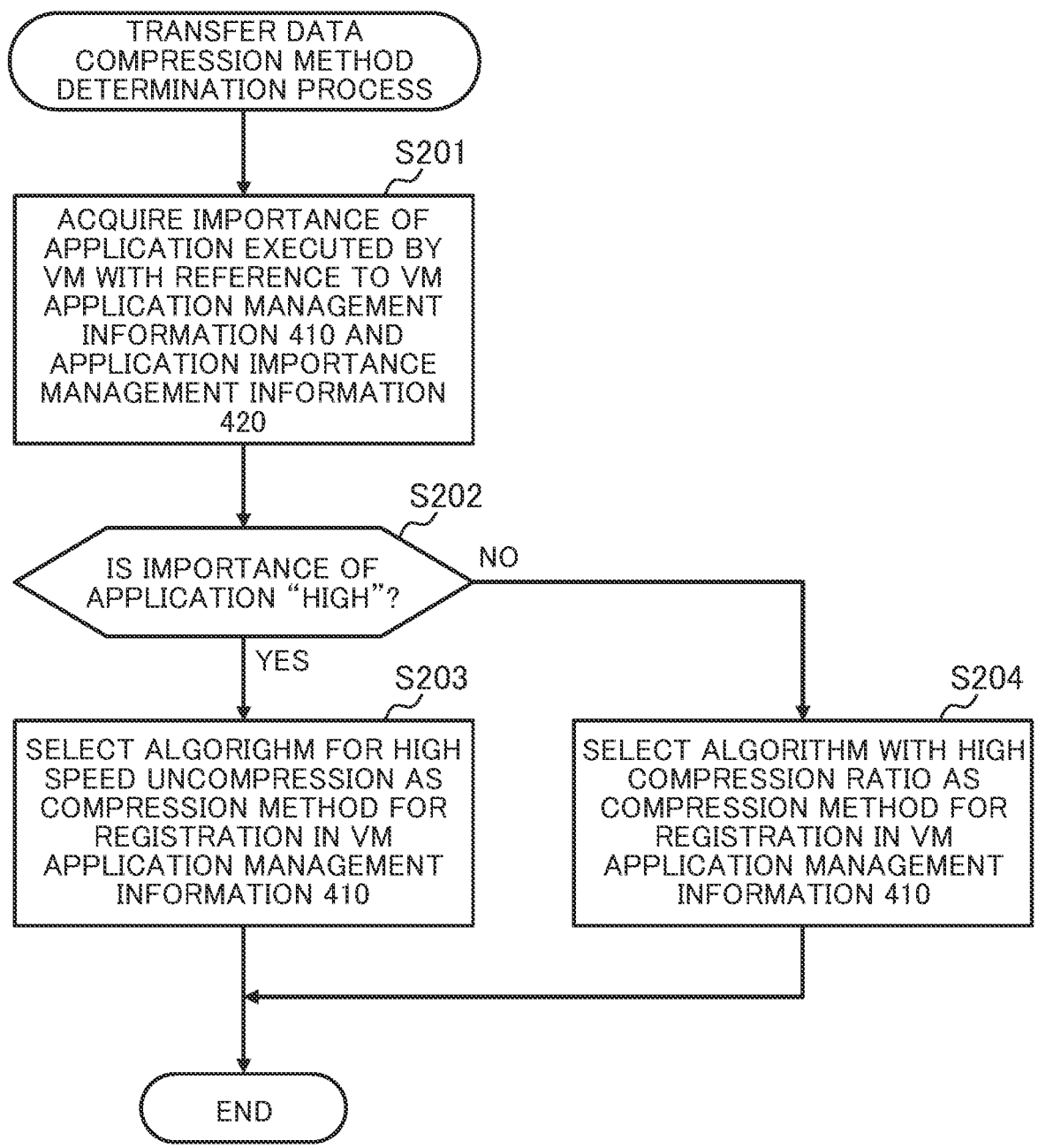
FIG. 9 is a flowchart representing a processing procedure example of transfer data compression method determination processing.

FIG. 9 is a flowchart representing a processing procedure example of transfer data compression method determination processing. The transfer data compression method determination processing is executed for determining the compression method of data transferred from the primary site 100 to the secondary site 200. The DR management program 460 of the cloud management node 300 executes the processing for each of the VMs 152.

The information processing system 1 according to the embodiment compresses the data stored in the on-premise storage 130 in the primary site 100 by the predetermined compression method (compression algorithm), and transfers the compressed data to the secondary site 200 so that the data transfer time can be reduced as well as the transfer cost. The compressed data transferred to the DR destination (secondary site 200) will be decompressed as needed (for example, upon start of fail-over in response to occurrence of failure in the method of pilot-right type). This makes it possible to reduce the DR cost in the cloud.

Referring to FIG. 9, similar to step S101 in FIG. 8, with reference to the VM application management information 410 and the application importance management information 420, the DR management program 460 acquires the importance placed on the application 153 to be executed by the VM 152 as the processing object (step S201).

With reference to the application importance acquired in step S201, the DR management program 460 confirms whether the importance satisfies a predetermined determination criterion (step S202), and determines the transfer data compression method in accordance with the determination result. Referring to the processing example as represented in FIG. 9, if the application importance acquired in step S201 is "high" (YES in step S202), the process proceeds to step S203. If the application importance acquired in step S201 is "low" (NO in step S202), the process proceeds to step S204.

When the process proceeds from step S202 to step S203, the DR management program 460 selects the compression algorithm which attains high decompression speed (short decompression time) from the preliminarily provided multiple types of compression algorithms, and determines the selected compression algorithm as the transfer data compression method. The determined content is then registered in the compression method 415 of the VM application management information 410. As described above, the DR environment for the VM2 which executes the application 2 with high importance is constructed by the method of multi-site type. Accordingly, it is essential to transfer the data to the DR destination in a short time. That is, in the case of data for the application 2 with high importance, importance is placed on the compressed data decompression speed (short decompression time) rather than the high data compression ratio. Therefore, in step S203, the DR management program 460 determines the "algorithm 2" which attains high decompression speed but does not attain high compression ratio as the data compression method for the application 2 (VM2). The "algorithm 2" is registered in the compression method 415 corresponding to the VM2 (application 2).

When the process proceeds from step S202 to step S204, the DR management program 460 selects the compression algorithm which attains high compression ratio from the preliminarily provided multiple types of compression algorithms, and determines the selected compression algorithm as the compression method to be used for data transfer. The determined content is registered in the compression method 415 of the VM application management information 410. As described above, the DR environment for the VM1 which executes the application 1 with low importance. Accordingly, it is essential to suppress resource usage of the DR destination. That is, in the case of data of the application 1 with low importance, importance is placed on high data compression ratio rather than the decompression speed of the compressed data (short decompression time). Therefore, in step S204, the DR management program 460 determines the "algorithm 1" with high compression ratio despite relatively low speed for decompressing the compressed data as the data compression method for the application 1 (VM1). The "algorithm 1" is registered in the compression method 415 corresponding to the VM 1 (application 1).

At the end of the step S203 or S204, the DR management program 460 finishes execution of the transfer data compression method determination processing.

The foregoing transfer data compression method determination processing is configured to determine the compression algorithm for each of the VMs 152. The processing may be modified to allow the DR management program 460 to determine the compression algorithm for each volume or each data region in the single volume.

(2-3) Data Transfer Network Determination Processing

Figure 10:
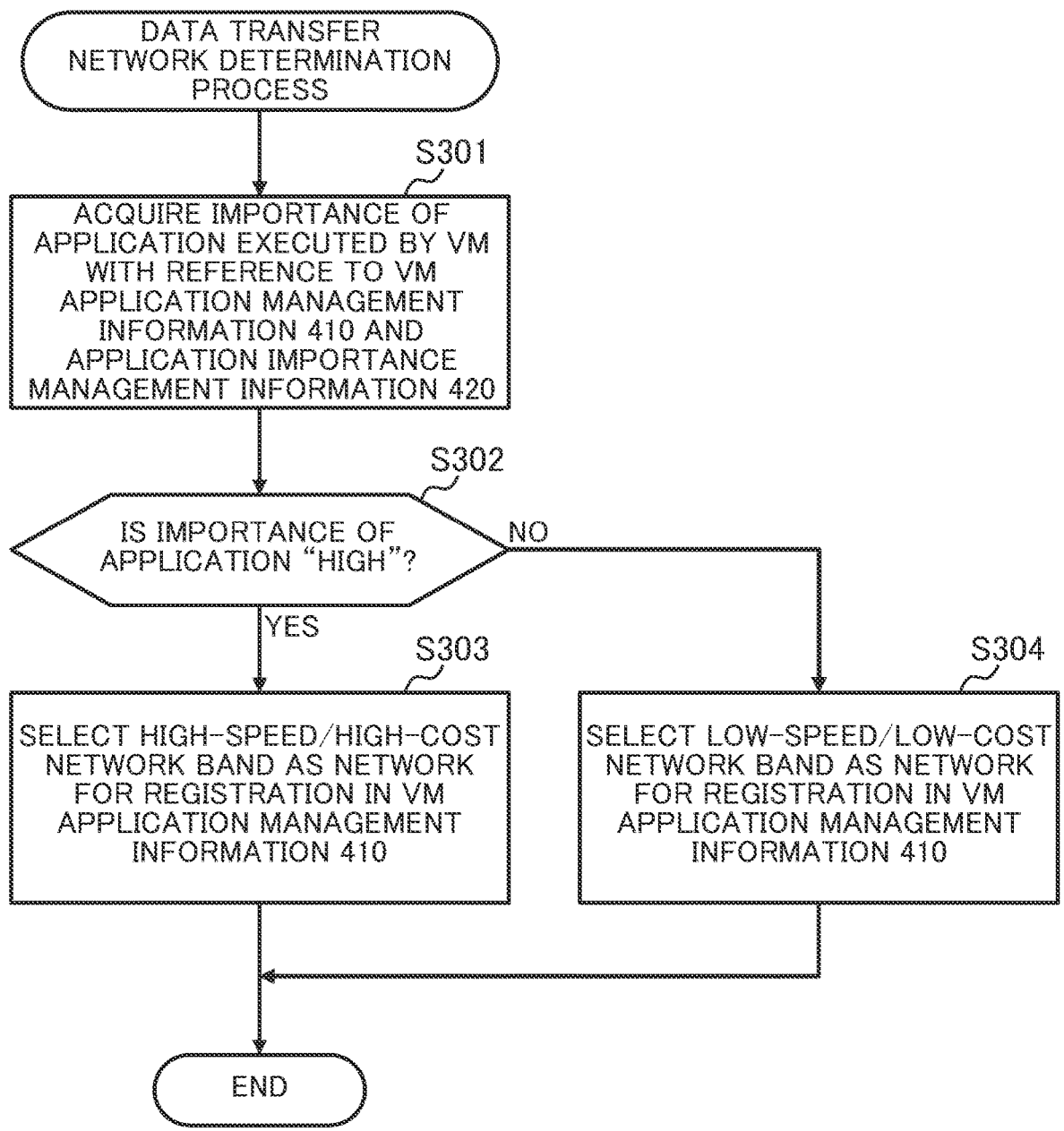
FIG. 10 is a flowchart representing a processing procedure example of data transfer network determination processing.

FIG. 10 is a flowchart representing a processing procedure example of the data transfer network determination processing. The data transfer network determination processing is executed for determining the network type to be used for data transfer between the primary site 100 and the secondary site 200. The DR management program 460 of the cloud management node 300 executes the processing for each of the VMs 152.

Referring to FIG. 10, like the step S101 in FIG. 8 and the step S201 in FIG. 9, with reference to the VM application management information 410 and the application importance management information 420, the DR management program 460 acquires the importance of the application 153 to be executed by the VM 152 as the processing object (step S301).

With reference to the application importance acquired in step S301, the DR management program 460 confirms whether the importance satisfies a predetermined determination criterion (step S302), and determines the network type to be used for data transfer to the VM 152 as the processing object in accordance with the determination result. Referring to the processing example in FIG. 10, if the application importance acquired in step S301 is "high" (YES in step S302), the process proceeds to step S303. If the application importance acquired in step S301 is "low" (NO in step S302), the process proceeds to step S304.

When the process proceeds from step S302 to S303, the DR management program 460 determines the high speed/cost network band as the network type for transferring data to be used by the VM 152 as the processing object, and registers the information indicating the determined content in the network 417 of the VM application management information 410. Specifically, the RTO of data for the application 2 with high importance is regarded as being highly important. In step S303, the DR management program 460 determines to transfer data from the primary site 100 to the secondary site 200 using the high-speed (high-cost) network band, and registers "high speed" in the network 417 corresponding to the VM2 (application 2) as the information indicating the determined network type. The high-speed network may be exemplified by AWS Direct Connect.

Meanwhile, when the process proceeds from step S302 to step S304, the DR management program 460 determines the low-speed/cost network band as the network type for transferring data to be used by the VM 152 as the processing object, and registers the information indicating the determined content in the network 417 of the VM application management information 410. Specifically, the cost of data for the application 1 with low importance is regarded as being important higher than the RTO. In step S304, the DR management program 460 determines to transfer data from the primary site 100 to the secondary site 200 using the low-cost (low-speed) network band, and registers "low speed" in the network 417 corresponding to the VM1 (application 1) as the information indicating the determined network type. The low-speed network may be exemplified by the internet or the like.

Explanations have been made with respect to the data transfer destination determination processing for determining the data transfer destination and the data transfer method (FIG. 8), the transfer data compression method determination processing for determining the transfer data compression method (FIG. 9), and the data transfer network determination processing for determining the network type to be used for the data transfer (FIG. 10). However, all those processing operations do not have to be executed by the information processing system 1 according to the embodiment. A part of those determination processing operations may be executed selectively, or combination of multiple determination processing operations may be executed. If any one of the above-described determination processing operations is not executed, the use of alternative means for such determination processing (user's instruction and setting of the initial value) allows the information to be registered in each data field of the VM application management information 410 for each of the VMs.

(2-4) Data Transfer Processing

Figure 11:
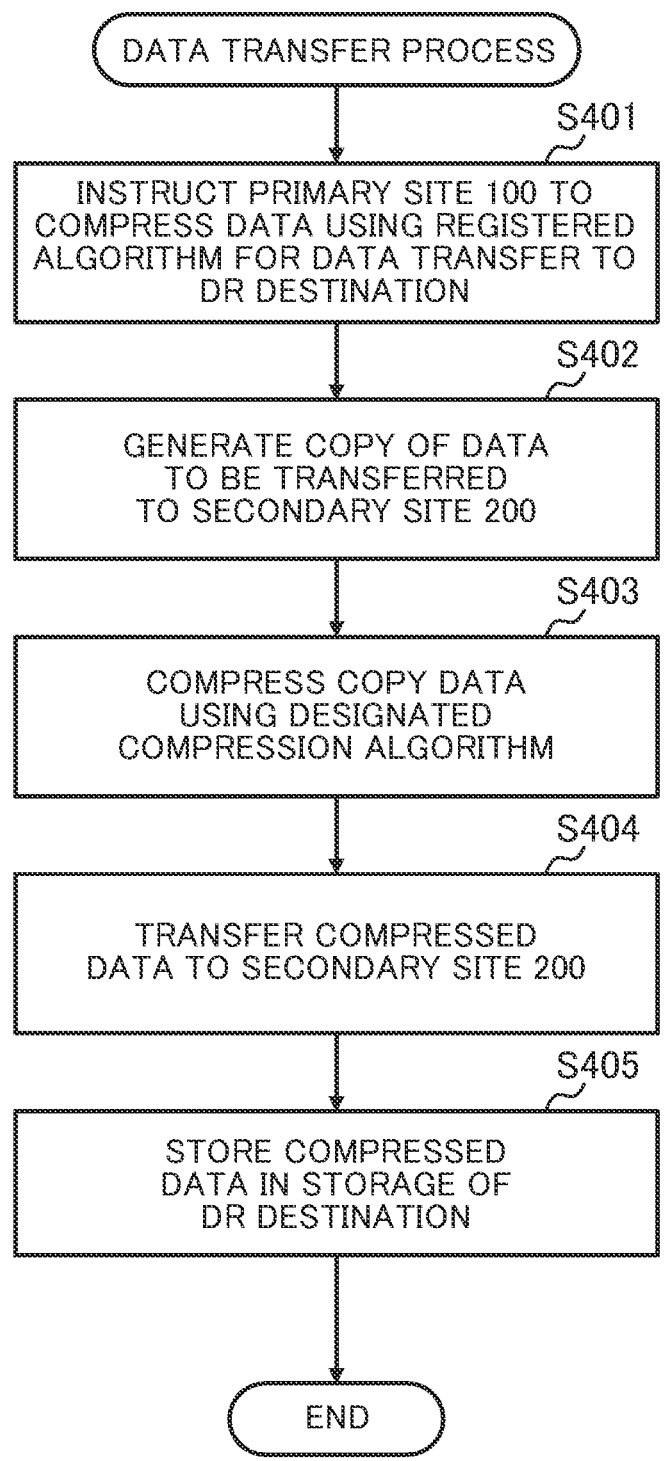
FIG. 11 is a flowchart representing a processing procedure example of data transfer processing.

FIG. 11 is a flowchart representing a processing procedure example of data transfer processing. The data transfer processing is executed for data transfer using the compression algorithm (compression method) determined by the transfer data compression method determination processing as represented in FIG. 9. The data transfer processing is executed by the DR management program 460 of the cloud management node 300, and the copy function 126 of the primary site 100.

Referring to FIG. 11, the DR management program 460 instructs the primary site 100 to compress data using the compression algorithm registered in the compression method 415 of the VM application management information 410 upon data transfer to the DR destination (step S401). The instruction may be given from the cloud management node 300 via the storage management device.

The copy function 126 in the storage controller 120 generates a copy of data to be transferred to the secondary site (step S402).

The compression function in the storage controller 120 executes the compression processing to the data copied by the copy function 126 in step S402 using the designated compression algorithm (step S403). The compression function is implemented by the processor 111 for executing the predetermined program. Although not shown in FIGS. 1 and 2, the copy function 126 is allowed to implement the compression function.

The copy function 126 in the storage controller 120 transfers the compressed data after completion of the compression processing in step S403 to the secondary site 200 (step S404). The data are transferred in accordance with the registered information in the VM application management information 410.

In the secondary site 200, the cloud service management 230 stores the compressed data transferred in step S404 in the storage system corresponding to the DR environment in the secondary site 200 (step S405), and finishes the data transfer processing. The storage system corresponding to the DR environment is designated by the transfer destination 414 of the VM application management information 410. In the secondary site 200, the transferred compressed data are stored as they are so that they are decompressed when needed. This makes it possible to reduce the DR cost of the cloud.

The compression algorithm designated by the compression method 415 of the VM application management information 410 may be preliminarily provided in the memory within the storage controller 120, or stored in the storage controller 120 from outside the primary site 100 by downloading upon reception of the instruction. The compression function may be provided in another structure of the primary site 100 without being limited to the provision in the storage controller 120. The compression processing may be executed by the compression function on a background during data transfer. In this case, the compressed data can be transferred as required while allowing execution of the compression processing. This makes it possible to reduce the time required for data transfer.

(2-5) Disaster Recovery Processing

Upon detection of failure in the primary site 100, the information processing system 1 executes the disaster recovery (DR) processing to apply fail-over to the secondary site 200. Specifically, the DR management program 460 starts the fail-over, and instructs switching of the site to the secondary site 200. If the DR method of multi-site type is selected, the same system as that of the primary site 100 has been constantly operated in the secondary site 200 (DR environment has been constructed). Accordingly, the active environment can be easily switched. Meanwhile, if the method of pilot-light type is selected, normally, the secondary site 200 has only a minimum part kept stand-by. Accordingly, the resource is allocated to the part except the one kept stand-by, and the VM is started so that the DR environment is constructed. The DR environment may be constructed by the DR environment construction method of known pilot-light type. An example of the processing procedure will be described referring to FIG. 12.

Figure 12:
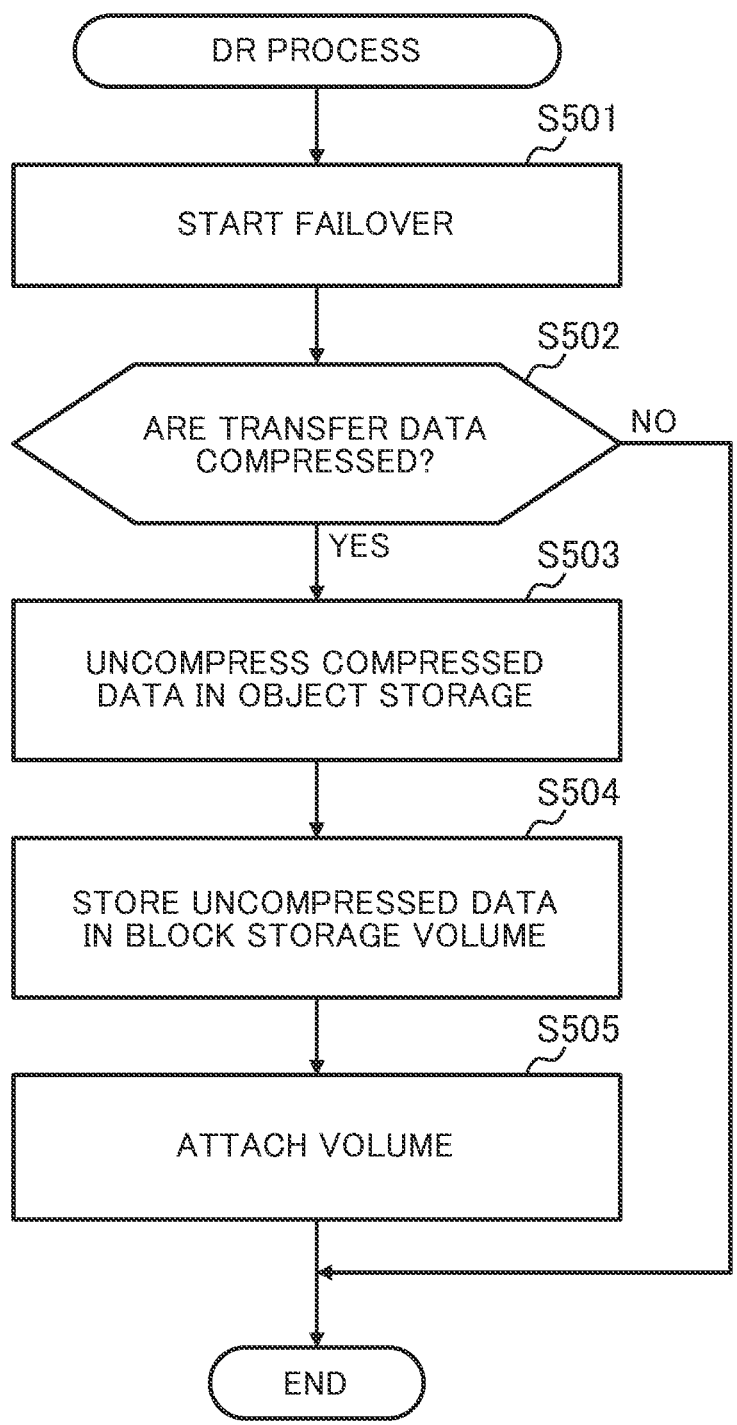
FIG. 12 is a flowchart representing a processing procedure example of disaster recovery processing using a method of pilot-light type.

FIG. 12 is a flowchart representing the processing procedure example of disaster recovery processing implemented by the method of pilot-light type. FIG. 12 represents the processing procedure example of the DR method of pilot-light type for the disaster recovery (DR) processing to be executed by the information processing system 1 upon detection of failure in the primary site 100. In this example, it is assumed that the compressed data to be transferred from the primary site 100 to the secondary site 200 have been stored in the second storage device 222 as the object storage.

Referring to FIG. 12, the DR management program 460 starts the fail-over to instruct the secondary site 200 to switch the site to the secondary site (step S501).

In the secondary site 200, the cloud service management 230 confirms whether or not the data transferred from the primary site 100 to the secondary site 200 are compressed data (step S502). Specifically, in step S502, the determination may be made with reference to the compression method 415 of the VM application management information 410. If the transferred data have been compressed (YES in step S502), the process proceeds to step S503. Meanwhile, if the transferred data have not been compressed (NO in step S502), the DR processing is finished.

The processing to be executed in step S503 and subsequent steps will be described. In the secondary site 200, the DR method of pilot-light type is used for the VM 152. In order to allow the data to be accessible from the VM 252 as the DR destination, the data compressed for data transfer have to be decompressed for conversion.

For example, in most cases, the data to be used by the VM 1 which executes the application 1 with low importance are stored in the low-cost storage (in this example, the second storage device 222). However, the VM 252 cannot directly access the data for usage because of the second storage device 222 as the object storage. The storage device, for example, the block storage or the file storage like the first storage device 221 allows data access from the VM 252. Accordingly, it is necessary to execute the processing of moving the data in the second storage device 222 as the object storage to the first storage device 221 as the block storage to store those data.

The cloud service management 230 instructs execution of decompression processing of the compressed data stored in the second storage device 222 as the object storage, and the second storage device 222 executes the decompression processing (step S503). Then volume to be provided to the VM1 is generated in the first storage device 221 as the block storage, and the data decompressed in step S503 are stored in the volume (step S504).

The cloud service management 230 attaches the volume which stores the data decompressed in step S504 to the VM1 (step S505), and finishes the DR processing. Execution of the processing in step S505 allows the VM1 (VM 252) to access the data in the volume within the block storage.

The processing executed in steps S503 to S505 is not limited to the DR processing executed by the method of pilot-light type, but broadly applicable to the case where the storage system 220 in the secondary site 200 is the object storage for storing the backup data (data derived from copying and compressing the data to be used by the VM 152) of the primary site 100 as a result of data transfer.

In the foregoing description, the processing procedure is executed upon the fail-over. The processing executed in step S503 for decompressing the compressed data stored in the second storage device 222 may be replaced with the processing for decompressing the compressed data by storage controller or hardware such as a circuit within the first storage device 221, or other node and appliance of the cloud within the secondary site 200. That is, the section where the processing of decompressing the compressed data is executed is not limited to the one within the second storage device 222, but may be the one within the first storage device 221 or any other section.

As described above, the information processing system 1 according to the embodiment is configured to determine various settings relating to data transfer to the DR destination for each of the VMs 152 based on the importance of the application 153 by implementing the DR method (pilot-light type and multi-site type) adapted to the service desired by the customer using the application 153. This makes it possible to provide the disaster recovery configuration adapted to the service (application) to be used by the customer. The information processing system 1 transfers data to the DR destination by compressing the data using the compression method (compression algorithm) determined based on the importance of the application 153 to store the compressed data in the DR destination as they are until decompression is needed in the DR destination. This may suppress the cost increase in the DR destination (secondary site 200) in the cloud environment, resulting in reduction in the cost of overall disaster recovery system.

(3) Other Embodiments

The present invention is not limited to the above-described embodiment, but variously modified. In the following description, several embodiments (modifications) according to the present invention will be described. Explanations with respect to configurations and processing operations of the information processing system 1, which are omitted in the following modifications may be considered as being similar to those of the above-described embodiment.

(3-1) First Modification

The information processing system 1 may be configured to determine the transfer data compression method (compression algorithm) by implementing the processing procedure other than the transferred data compression method determination processing as represented by FIG. 9. Specifically, the determination is made based on the estimated required time (DR environment construction time) taken from the start of fail-over for constructing the DR environment until the VM 252 as the DR destination becomes ready for start-up.

FIG. 13 is a flowchart representing another example of processing procedure of the transfer data compression method determination processing. Similar to the transfer data compression method determination processing as represented in FIG. 9, the transfer data compression method determination processing as represented in FIG. 13 is executed by the DR management program 460 of the cloud management node 300 for each of the VMs 152.

Referring to FIG. 13, the DR management program 460 estimates the decompression processing time per unit data size of the compression data (step S601). The DR management program 460 estimates the instance generation time per unit resource required for generating the instance (step S602). The instance generation time includes the time required for securing the resource and starting the VM 252.

Based on the number of resources required to be secured for constructing the DR environment, and the instance generation time estimated in step S602, the DR management program 460 estimates the required DR environment construction time taken from the start of the fail-over for constructing the DR environment until the VM 252 as the DR destination becomes ready for start-up (step S603).

After each estimation is performed in steps S601 to S603, the DR management program 460 selects the compression algorithm for compression to attain data amount which allows the "compressed data decompression processing time" to be within the DR environment construction time which has been estimated in step S603 from preliminarily provided multiple types of compression algorithms. The selected compression algorithm is registered in the compression method 415 corresponding to the VM of the VM application management information 410 as the data compression method for the VM 152 as the processing object (step S604). The "compressed data decompression processing time" may be calculated based on the data compression ratio derived from the compression algorithm, the decompression processing time per unit data size which has been estimated in step S601, and the number of resources required to be secured for DR environment construction used in step S603.

The thus determined compression method is implemented to compress the transfer data to allow the information processing system 1 to decompress the compressed data on the background of the processing associated with the DR environment construction. In the foregoing case, it is estimated that the compressed data decompression processing may be finished before completion of the DR environment construction. This allows the started VM 252 to access the data without delay. Accordingly, the effect for reducing the time required for the fail-over can be expected.

In the foregoing modification, the compression algorithm is determined for each VM. However, it is possible for a still further modification of the transfer data compression method determination processing to determine the compression algorithm for each data region in the single volume. Such determination is intended to secure the resource for the DR environment construction using the method of pilot-light type, and finish the processing of decompressing the compressed data stored in the object storage (second storage device 222) within the time for starting the VM. As the compression algorithm is determined through fragmentation of the object, the data decompression processing may be securely finished before completion of the DR environment construction. This makes it possible to provide the effect of preventing delay in the operation restoration time.

(3-2) Second Modification

As another modification of selecting the storage at the storage destination of the transfer data, the information processing system 1 may be configured to select the object storage or the block storage (or file storage) as the storage at the storage destination of the transfer data based on the start-up time of the VM 252 upon the fail-over instead of executing the processing procedure of the data transfer destination determination processing as represented in FIG. 8.

As described above, the VM 252 cannot access the compressed data stored as they are in the object storage (second storage device 222), and accordingly, those data have to be moved to the block storage or the like (first storage device 221). This may prolong the time required for executing a series of processing operations compared with the time for storing the compressed transfer data in the block storage. If the start-up time of the VM 252 is long, the problem hardly occurs. If the start-up time of the VM 252 is short, the time taken for making the data accessible after start-up of the VM 252 may be delayed upon the fail-over.

The foregoing modification has been made from the above-described viewpoint. The storage at the storage destination of the transfer data is determined based on the start-up time of the VM 252 upon the fail-over so that the VM 252 is allowed to access the decompressed data immediately after the end of start-up upon the fail-over (or after an elapse of the stand-by time subsequent to the end of start-up).

(3-2) Second Modification

Change in the form of operations of the customer who uses the storage service derived from the information processing system 1 may vary the importance of the application 153 to be used. In response to variation in the importance of the application, the information processing system 1 may be configured to re-execute the respective processing operations as represented in FIGS. 8 to 10 to update the respective corresponding information data to be determined based on the importance of the application (specifically, the transfer destination 414, the compression method 415, the transfer method 416, the network 417 of the VM application information 410).

(3-3) Third Modification

In the embodiment as described above, the importance of the application is preliminarily determined based on the user's (customer's) instruction or analysis by the cloud management node 300. In the DR environment where the user sets the DR method with level which differs for each VM, the DR management program 460 may be configured to determine the importance of the application to be executed on the VM based on the DR method. Specifically, the importance of the application may be determined in accordance with each type of the DR method corresponding to the application. For example, in the case of using the pilot-light type, "low" importance is placed on the application, and in the case of using the multi-site type, "high" importance is placed on the application. Thereafter, the information processing system 1 (DR management program 460) is allowed to determine the storage class of the data transfer destination of the data transfer between the primary site 100 and the secondary site 200, and compression method upon data storage utilizing the determined importance of the application in the similar manner to the embodiment as described above.

The information processing system 1 may be configured to determine the DR method based on the predetermined importance of the application similar to the embodiment, the first and the second modifications, or based on the predetermined DR method similar to the third modification. Based on the determined conditions, various settings for data transfer to the DR destination (transfer destination storage, compression method, data transfer method, network type to be used for data transfer) are determined to allow the overall cost reduction accompanied with construction of the DR configuration while providing the DR configuration adapted to the service used by the user (customer).

The invention claimed is:

1. A disaster recovery system provided with a disaster recovery configuration which allows a secondary site to recover a virtual computer and an application, which have been executed in a primary site for supplying services in a normal time in response to occurrence of failure in the primary site, comprising:
    the primary site including a first server system for operating the virtual computer which executes the application, and a first storage system for storing data to be used by the first server system in a storage;
    the secondary site including a second storage system for storing backup data for backing up data used by the first server system in a cloud storage, and a second server system for recovering the virtual computer and the application in consideration of a correspondence relation in the primary site using the backup data stored in the cloud storage upon occurrence of the failure; and
    a cloud management node for controlling an operation to construct the disaster recovery configuration including the primary site and the secondary site, and mediating data transfer for transferring the backup data from the primary site to the secondary site, wherein the cloud management node manages importance information indicating importance placed on a performance of each of the applications to be executed in the primary site in correspondence with the virtual computer for executing the application, determines a disaster recovery method adapted to the virtual computer and the application by selection from multiple types of the disaster recovery methods based on the importance information of the corresponding application for each of the virtual computers, and determines a content of a predetermined set item applied to the data transfer of data to be used by the virtual computer based on the importance information of the corresponding application for each of the virtual computers.

2. The disaster recovery system according to claim 1, wherein in the data transfer,
    the cloud management node compresses the backup data in the first storage system of the primary site, and transfers the compressed data to the second storage system of the secondary site; and
    the second storage system stores the backup data which have been transferred from the primary site in a compressed state.

3. The disaster recovery system according to claim 2, wherein:
    at least a pilot-light type is included in the multiple types of disaster recovery methods; and
    in the transfer of data to be used by the virtual computer to which the pilot-light type is applied, the second storage system stores at least a part of the backup data transferred from the primary site in the compressed state until the recovery is started.

4. The disaster recovery system according to claim 2, wherein the cloud management node determines a compression algorithm to be used for compression of the backup data in the data transfer as a determined content of the predetermined set item by selection from multiple types of compression algorithms each at a different data compression ratio or speed of decompressing the compressed data based on the importance information of the corresponding application for each of the virtual computers.

5. The disaster recovery system according to claim 2, wherein:
    the cloud management node estimates required environment construction time taken from start of a fail-over for the recovery until completion of start of the virtual computer for each of the virtual computers; and
    a compression algorithm which allows compression of the backup data to an amount of data which attains time required for decompressing the backup data to be within the estimated environment construction time is selected from the multiple types of compression algorithms each at a different data compression ratio or data decompression speed of the compressed data, and the selected compression algorithm is determined to be used for compressing the backup data in the data transfer.

6. The disaster recovery system according to claim 1, wherein:
    the second storage system has multiple types of cloud storages each with a different resource usage cost or a different performance; and
    the cloud management node determines a storage destination of the backup data in the data transfer as a determined content of the predetermined set item by selection from the multiple types of cloud storages based on the importance information of the corresponding application for each of the virtual computers.

7. The disaster recovery system according to claim 1, wherein the cloud management node determines a transfer method of the backup data in the data transfer as a determined content of the predetermined set item by selection from multiple types of transfer methods including a synchronous copy and an asynchronous copy based on the importance information of the corresponding application for each of the virtual computers.

8. The disaster recovery system according to claim 1, wherein the cloud management node determines a network type for transferring the backup data in the data transfer as a determined content of the predetermined set item by selection from multiple types of networks each at a different communication cost or communication speed based on the importance information of the corresponding application for each of the virtual computers.

9. The disaster recovery system according to claim 1, wherein:
the second storage system includes a first storage device which allows the virtual computer generated by the second server system to directly access data, and a second storage device which does not allow the virtual computer generated by the second server system to directly access data; and
in the case where the backup data in the data transfer are stored in the second storage device when the cloud management node instructs the secondary site to execute a fail-over for the recovery, the backup data are decompressed to be stored in a volume generated in the first storage device, and the volume is attached to the virtual computer for using the backup data.

10. The disaster recovery system according to claim 1, wherein in the case of designation of the disaster recovery method applied to the virtual computer and the application for each of the virtual computers, the cloud management node determines the importance information of the application to be executed by the virtual computer based on the designated disaster recovery method.

11. A disaster recovery method implemented by a disaster recovery system provided with a disaster recovery configuration which allows a secondary site to recover a virtual computer and an application, which have been executed in a primary site for supplying services in a normal time in response to occurrence of failure in the primary site, the disaster recovery system including:
the primary site having a first server system for operating the virtual computer which executes the application, and a first storage system for storing data to be used by the first server system in a storage;
the secondary site having a second storage system for storing backup data for backing up data used by the first server system in a cloud storage, and a second server system for recovering the virtual computer and the application in consideration of a correspondence relation in the primary site using the backup data stored in the cloud storage upon occurrence of the failure; and
a cloud management node for controlling an operation to construct the disaster recovery configuration including the primary site and the secondary site, and mediating data transfer for transferring the backup data from the primary site to the secondary site, wherein the cloud management node:
manages importance information indicating importance placed on a performance of each of the applications to be executed in the primary site in correspondence with the virtual computer for executing the application;
determines a disaster recovery method adapted to the virtual computer and the application by selection from multiple types of the disaster recovery methods based on the importance information of the corresponding application for each of the virtual computers; and
determines a content of a predetermined set item applied to the data transfer of data to be used by the virtual computer based on the importance information of the corresponding application for each of the virtual computers.

* * * * *